April 28, 1959  G. F. BLOXHAM ET AL  2,883,893
APPARATUS FOR CUTTING AND JOINING TAPES
Filed May 22, 1956  5 Sheets-Sheet 1

INVENTORS,
G. F. BLOXHAM
W. J. HYDE
BY A.C. Schwarz Jr.
ATTORNEY

FIG. 2

INVENTORS,
G. F. BLOXHAM
W. J. HYDE
BY A.C. Schwarz, jr
ATTORNEY

April 28, 1959     G. F. BLOXHAM ET AL     2,883,893
APPARATUS FOR CUTTING AND JOINING TAPES
Filed May 22, 1956     5 Sheets-Sheet 5

FIG. 6

INVENTORS
G. F. BLOXHAM
W. J. HYDE
BY
ATTORNEY

United States Patent Office 2,883,893
Patented Apr. 28, 1959

2,883,893

APPARATUS FOR CUTTING AND JOINING TAPES

Gordon F. Bloxham and William J. Hyde, Baltimore, Md., assignors to Western Electric Company, Incorporated, New York, N.Y., a corporation of New York Application May 22, 1956, Serial No. 586,456

8 Claims. (Cl. 78—82)

This invention relates to apparatus for cutting and joining tapes, and more particularly to apparatus for cutting and joining a pair of tapes positioned in overlapping, spaced relationship to each other simultaneously and automatically.

In the manufacture of electrical cables for use in the communications field, it is often desirable to form an aluminum tape longitudinally into a tubular sheath around a multiplicity of insulated conductors, and to apply a sheath of plastic insulating material, such as polyethylene, around the resulting aluminum sheath. In the manufacture of such cables, the aluminum tape is formed into a sheath around the conductors by a tube forming means and the plastic insulating material is applied thereover by an extruder. It is obviously advantageous to perform these operations without interruption so that the cable can be manufactured continuously.

The main restriction on the continuous manufacture of such cables is that a finished cable usually is many times as long as commercial lengths of the aluminum tape. When this is the situation, it is often necessary to join successively the trailing ends of a plurality of pads of tape to the leading ends of other pads in order to provide a tape long enough to be applied around a complete length of the cable to be sheathed. In the past, many apparatus have been devised to secure the leading end of the tape from a new supply reel to a tape in the process of being withdrawn from a nearly-exhausted supply thereof. These apparatus have been, however, complicated and unsatisfactory for use in the manufacture of sheathed electrical cables.

It is an object of this invention to provide new and improved apparatus for cutting and joining tapes.

Another object of this invention is to provide new and improved apparatus for cutting and joining a pair of tapes positioned in overlapping, spaced relationship to each other simultaneously and automatically.

A further object of the invention is to provide new and improved apparatus for simultaneously cutting and splicing successive lengths of thin metal tapes.

Apparatus for cutting and joining a pair of tapes positioned in overlapping, spaced relationship to each other, illustrating certain features of the invention, may include a movable cutter normally positioned in the space between the tapes and means for moving the movable cutter with respect to a first one of the tapes to sever that tape. The moving means is designed so that the severing motion continues until the movable cutter has been moved to a position entirely on the opposite side of the first tape from its normal position. Means are provided for moving the second tape toward the first tape so that an end portion of the second tape is placed in overlapping relationship with a severed, free end of the first tape. Means are provided for joining the overlapping ends of the two tapes to form an integral tape occupying substantially the position formerly occupied by the first tape. Further, means are provided for moving the movable cutter from its opposite-side position, around a side edge of the integral tape, and back to its normal position in preparation for a subsequent cutting operation.

More specifically, apparatus for cutting and joining a plurality of thin metal tapes simultaneously and automatically may include a supporting plate over which a first tape being supplied to and formed around an electrical cable is advancing. The leading end of a second or new supply of tape is secured to the supporting plate above the tape being used. An accumulator is provided for storing a predetermined amount of the tape being used so that the tape accumulated can be payed out during the joining of the trailing end of that tape to the leading end of the new supply of tape.

As the tape being used nears exhaustion, a plurality of clamps are actuated to prevent relative movement between the leading end of the new supply of tape and the trailing end of the supply being used. At this time the accumulator pays out the tape accumulated thereby. A pair of cutters, one movable and one stationary, and a pair of cold welding dies, one of which is also movable and the other stationary, are actuated to cut and join the trailing end of the tape being used and the leading end of the new supply of tape. After such cutting and joining, the movable cutter comes to rest in a position below the joined tapes.

The movable cutter is mounted on a horizontally slidable carriage secured to the piston rod of a cylinder. At a predetermined time, fluid is applied to one side of the piston within the cylinder to move the carriage horizontally and carry the movable cutter from its position beneath the joined tapes. Guides are provided for moving the cutter vertically to a level above the joined tapes and fluid is applied to the other side of the piston to return the movable cutter to its original position above the joined tapes in preparation for a subsequent cutting operation.

The hereinabove-stated and other objects and features of the invention will be apparent from the following description of a specific embodiment of the invention, when read in conjunction with the accompanying drawings, in which.

Figures 1, 4:
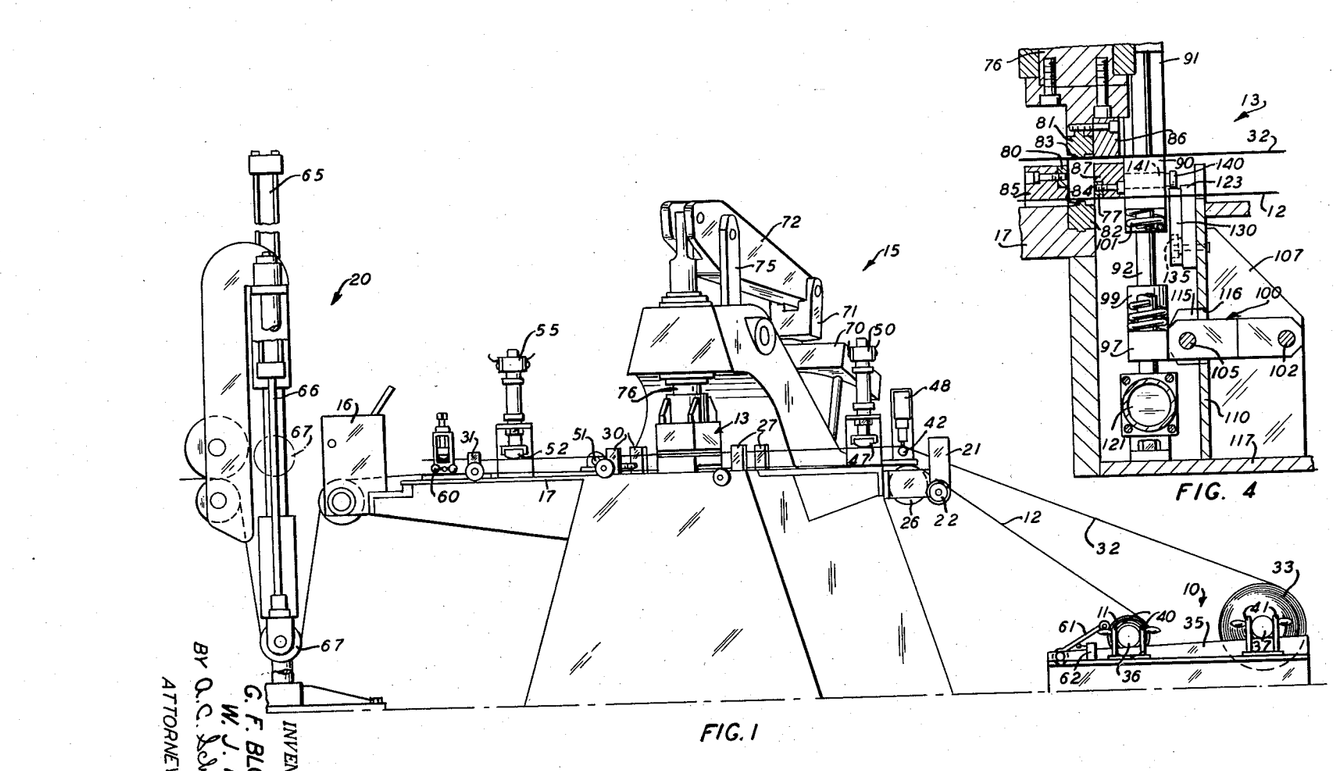
Fig. 1 is a side elevation of apparatus for cutting and joining a pair of tapes.
Fig. 4 is a reduced, fragmentary, vertical section taken along line 4—4 of Fig. 3, illustrating particularly the cutting and joining mechanism.
Figure 2:
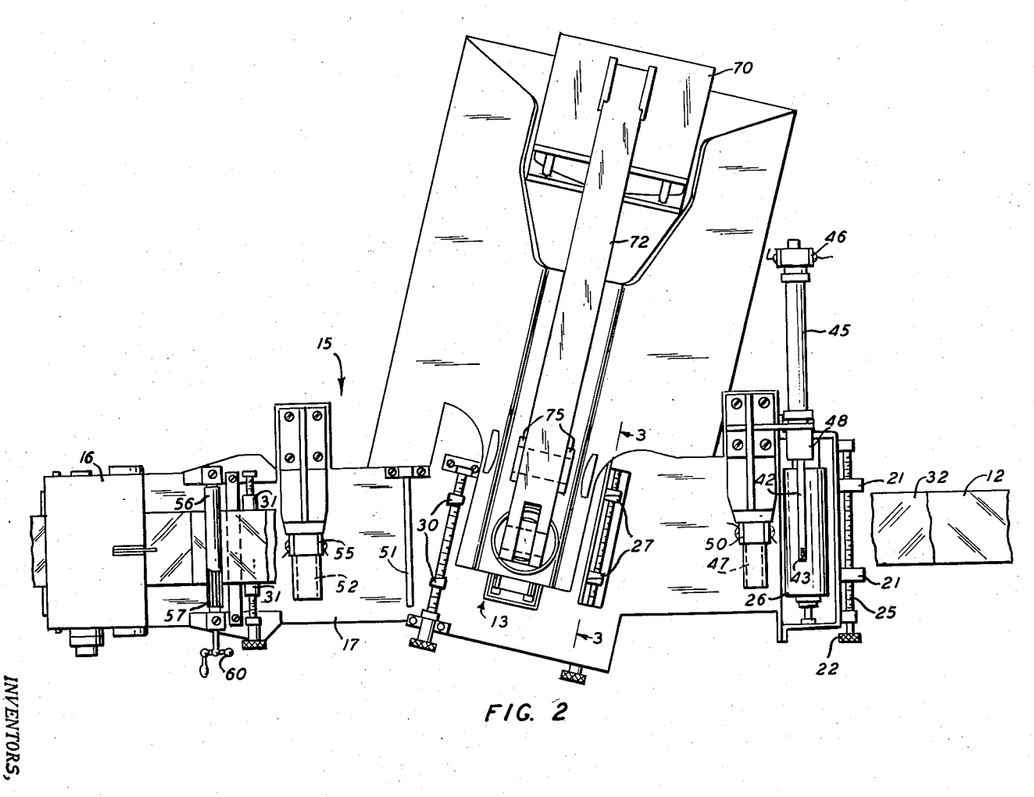
Fig. 2 is an enlarged, fragmentary plan view of a portion of the apparatus shown in Fig. 1.

Referring now to the drawings, and more specifically to Figs. 1 and 2, a supply stand 10 supports a pad 11 of a tape 12, such as aluminum tape, rotatably. The tape 12 passes through the head 13 of a cutting and cold welding machine, designated generally at 15, through a tensioning device 16 secured to a supporting plate 17 of the machine 15 and through an accumulator 20. From the accumulator 20, the tape 12 may be passed through a corrugating apparatus (not shown), which corrugates the tape transversely of its longitudinal axis, and a forming machine (not shown) which forms the corrugated tape longitudinally into a sheath around a multiplicity of insulated electrical conductors. If desired, the tape may be formed into an uncorrugated sheath around the conductors by a suitable tube forming device. A sheath of an insulating material, such as polyethylene, is then extruded around the tape to provide the finished electrical cable.

The tape 12 is guided onto the supporting plate 17 by adjustable guides 21—21. The guides 21—21 are adjustable horizontally by turning a knob 22 which rotates a shaft 25 having both left and right threads formed thereon. Threaded bores in the guides 21—21 cooperate with the opposite threads on the shaft 25 so that the distance between the guides 21—21 can be set in accordance with the width of the tape 12. The tape 12 passes over a roller 26, onto the supporting plate 17 and through a pair of adjustable guides 27—27. The guides 27—27 direct the tape 12 through the cutting and cold welding head 13. From the cutting and cold welding head 13, the tape 12 is directed by adjustable guides 30—30 and 31—31 to the tensioning device 16. The guides 27—27, 30—30 and 31—31 are constructed like the guides 21—21 except that the guides 27—27 and 30—30 are set at an angle with respect to the longitudinal axis of the tape 12.

The tape 12 usually is not as long as a particular length of an electrical cable to be covered thereby. It is necessary, therefore, to join the trailing end of the tape 12 to the leading end of a second tape 32 from a supply pad 33 after cutting the tapes to straighten and match the ends thereof. Such a new supply pad 33 of tape is shown in Fig. 1, and, like the pad 11 of the tape 12, is mounted rotatably on the supply stand 10. The pads 11 and 33 of the tape are supported between a pair of legs, such as the leg 35, which form a part of the supply stand 10.

The pads 11 and 33 of tape are supported on arbors 36 and 37, respectively, which are mounted rotatably on the legs 35—35 and which are held in place by vertical rods 40—40 and 41—41, respectively. Each of the rods 40—40 and 41—41 has a handle secured to the upper end thereof by which the rod can be turned. When the rods are rotated approximately 90°, the rods are so constructed that they drop to a level below the level of the legs 35—35. It can be seen then that convenient means are provided thereby to secure the arbors 36 and 37 rotatably and to release the arbors quickly when desired. When the tape 12 has been exhausted and the trailing end thereof joined to the leading end of the tape 32, the pad 33 of the tape 32 is permitted to advance to the position taken by the pad 11 of the tape 12 shown in Fig. 1.

When the new supply pad 33 of the tape 32 is to be placed on the supply stand 10, the right-hand rod 41 on each leg 35 is lowered, the pad 33 is placed in position and the right-hand rods are raised to secure the arbor 37 rotatably. When the pad 11 of tape 12 has been exhausted and the tapes 12 and 32 joined, the new pad 33 becomes the one being used. The left-hand rod 41 and the right-hand rod 40 on each leg 35 are then lowered, the arbor 37 is advanced until it contacts the left-hand rod 40 and the lowered rods 40 and 41 on each leg 35 are raised. Consequently, the arbor 37 of the new pad 33 of the tape 32 is mounted rotatably and in the correct position for a tape being used. Another arbor supporting a new supply of tape can then be placed in the position of the arbor 37 in Fig. 1.

The tape 32 from the new supply pad is directed by the guides 21—21 over a retractable rest 42 having a detent 43 formed near the end thereof. The rest 42 is connected to a piston within a cylinder 45 so that it may be withdrawn within the cylinder 45 and from the position shown in Fig. 2 beneath the tape 32 when fluid is directed to the cylinder 45 by a solenoid valve 46. From the rest 42, the tape 32 is passed under a fluid-operated clamp 47. As will be described more fully hereinafter, when fluid is directed to the cylinder 45, the rest 42 is withdrawn into the cylinder 45 and the detent 43 trips and closes a switch 48, and when fluid is directed to the clamp 47 by a solenoid valve 50, the clamp is depressed to hold the tapes 12 and 32 against relative movement and against the supporting plate 17. After passing beneath the clamp 47, the tape 32 is directed through the adjustable guides 27—27, the cutting and cold welding head 13 and the adjustable guides 30—30.

The guides 30—30 direct the tape 32 over a fixed rest 51, beneath a second fluid-operated clamp 52, which is similar to the clamp 47 and is operated by a solenoid valve 55, through the adjustable guides 31—31 and to a pair of pinch rolls 56 and 57. The leading end of the new tape 32 can be secured between the pinch rolls 56 and 57 (Fig. 2) by rotating the lower roll 57 with a crank 60. The tape 12, to be formed first into a tube around the cable conductors, advances directly over and in contact with the supporting plate 17, while the tape 32 from the new supply pad, to be formed subsequently around the conductors, is secured in a position above the tape 12 and the plate 17.

Figure 5:
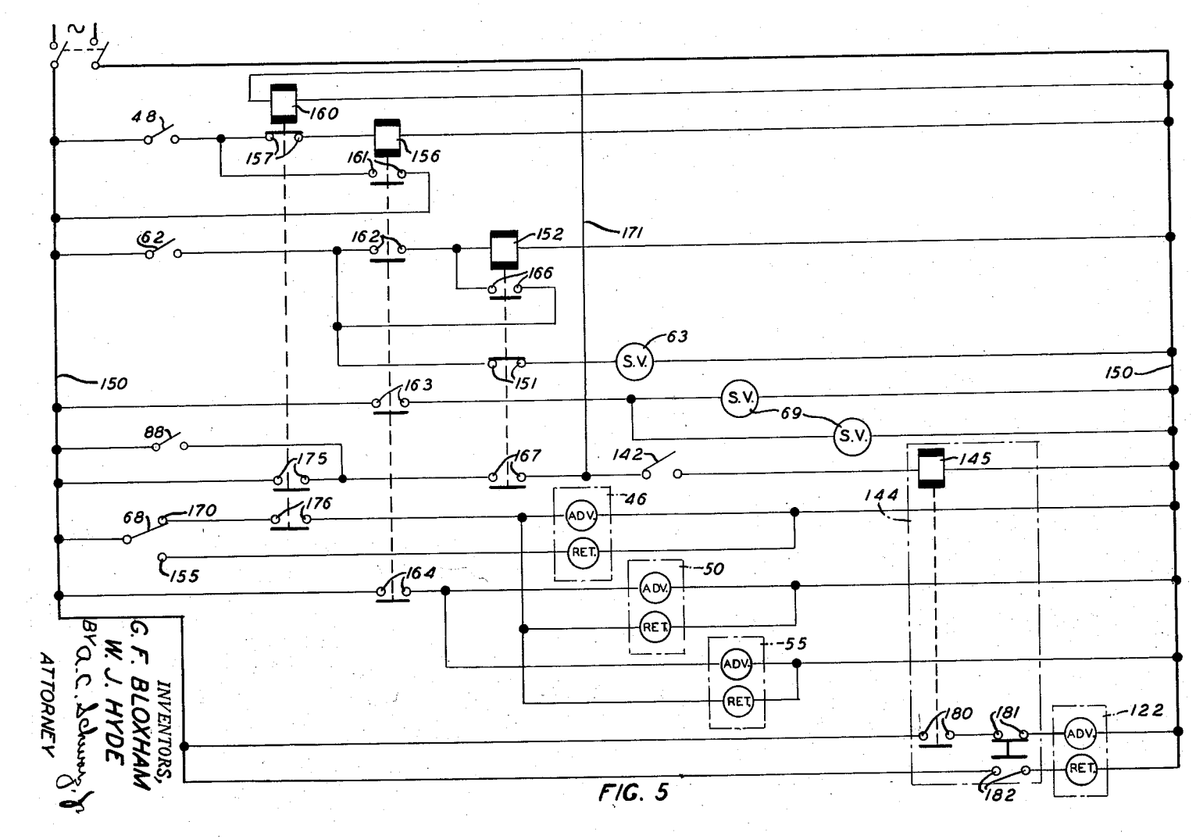
Fig. 5 is a schematic representation of a control system by means of which the apparatus embodying the invention is operated.

As the pad 11 of the tape 12 being used nears exhaustion, an arm 61, which is mounted pivotally to the legs 35—35 of the supply stand 10 and which follows the pad 11 of tape 12, causes a switch 62 to be closed. The closing of the switch 62 energizes a solenoid valve 63, forming part of the circuit shown in Fig. 5, in the accumulator 20 so that fluid is exhausted from a cylinder 65 therein. This causes a piston rod 66 of the cylinder 65 and a roller 67 secured by suitable means to the lower end of the piston rod 66 to descend and to accumulate a length of the tape 12. When the roller 67 reaches the bottommost part of its descent, as shown in solid lines in Fig. 1, a switch 68, not shown in Fig. 1 but forming part of the circuit shown in Fig. 5, is closed by the supporting structure of the roller 67 to energize the solenoid valve 46.

When the solenoid valve 46 is energized, the rest 42 is withdrawn within the cylinder 45. The detent 43 (Fig. 2) formed in the rest 42 causes the switch 48, mounted upon the cylinder 45, to be closed to energize the solenoid valves 50 and 55. Energization of the solenoid valves 50 and 55 causes the clamps 47 and 52, respectively, to descend and hold the tapes 12 and 32 together and to the supporting plate 17. At substantially the same time, fluid is also applied by the valve 63 to the cylinder 65 to start the roller 67 moving upwardly. The upward movement of the roller 67 permits the tape 12 to be fed to the left, as seen in Fig. 1, to the tube forming and sheathing means, while the tapes 12 and 32 to the right of the accumulator 20 are secured against movement. Before the roller 67 reaches its upper position, as shown in phantom lines in Fig. 1, the tapes 12 and 32 have been cut, joined together and released from the supporting plate 17 by energizing the solenoid valves 50 and 55 to retract the clamps 47 and 52, respectively.

The closing of the switch 48 by the retracting of the rest 42 causes the cutting of the trailing end of the tape 12 and the leading end of the tape 32 and the cold welding together of these ends. This is done by energizing a pair of solenoid valves 69—69, forming a part of the circuit shown in Fig. 5, which direct fluid to a cylinder 70 (Fig. 1). A piston rod 71 of the cylinder 70 is connected pivotally to a lever arm 72, which is mounted pivotally to the machine 15 by vertical standards 75—75. When the cylinder 70 is so energized, a ram 76 descends to sever and join the tapes 12 and 32. Because the cutting and cold welding machine 15 is arranged at an angle to the path of the tapes 12 and 32, as shown in Fig. 2, the tapes 12 and 32 are cut and joined at an angle to the paths of the tapes. This is done so that, when the tape is formed into a tube around the cable conductors, the splice between the tapes will not be in a circle around the conductors but will extend in a helical fashion therearound.

Figure 3:
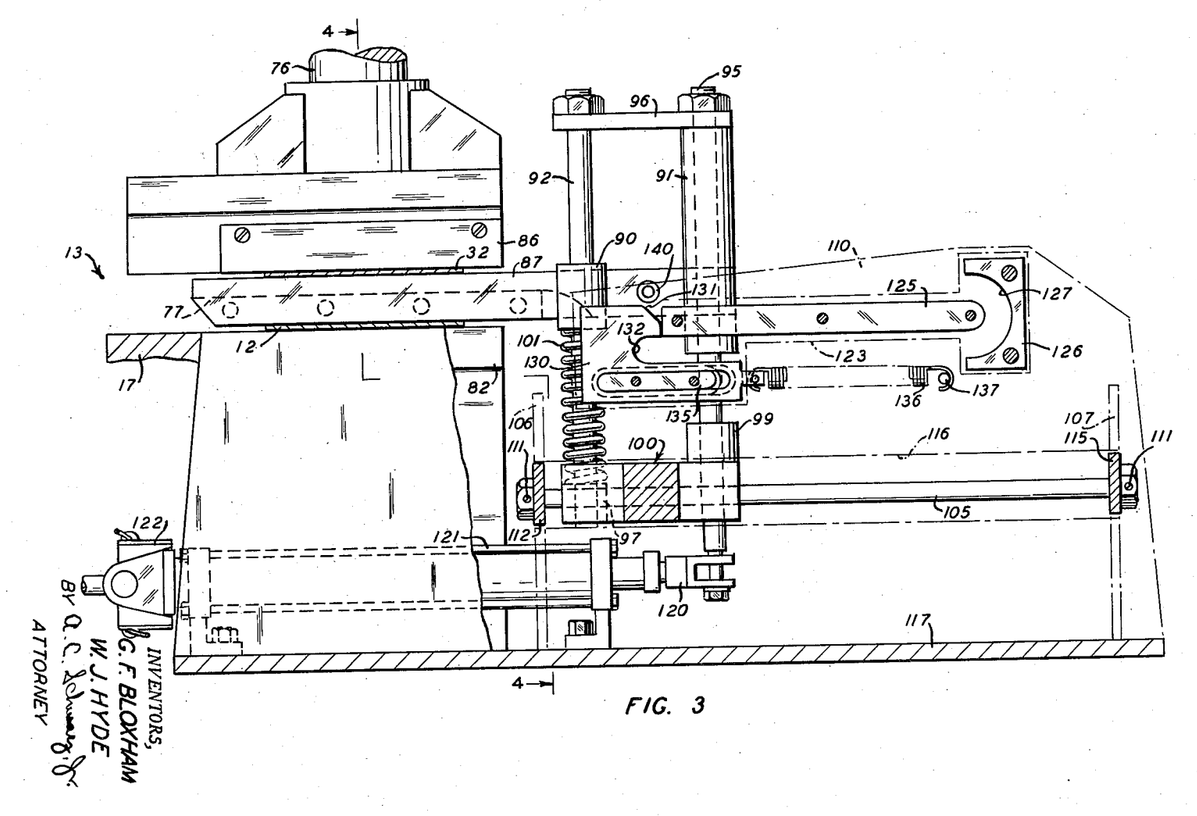
Fig. 3 is an enlarged, fragmentary, vertical section taken generally along line 3—3 of Fig. 2, with portions of supporting structure to the right of Fig. 3 broken away to reveal details of the movable-cutter return mechanism, the removed portions of supporting structure being shown in phantom lines.
Figure 6:
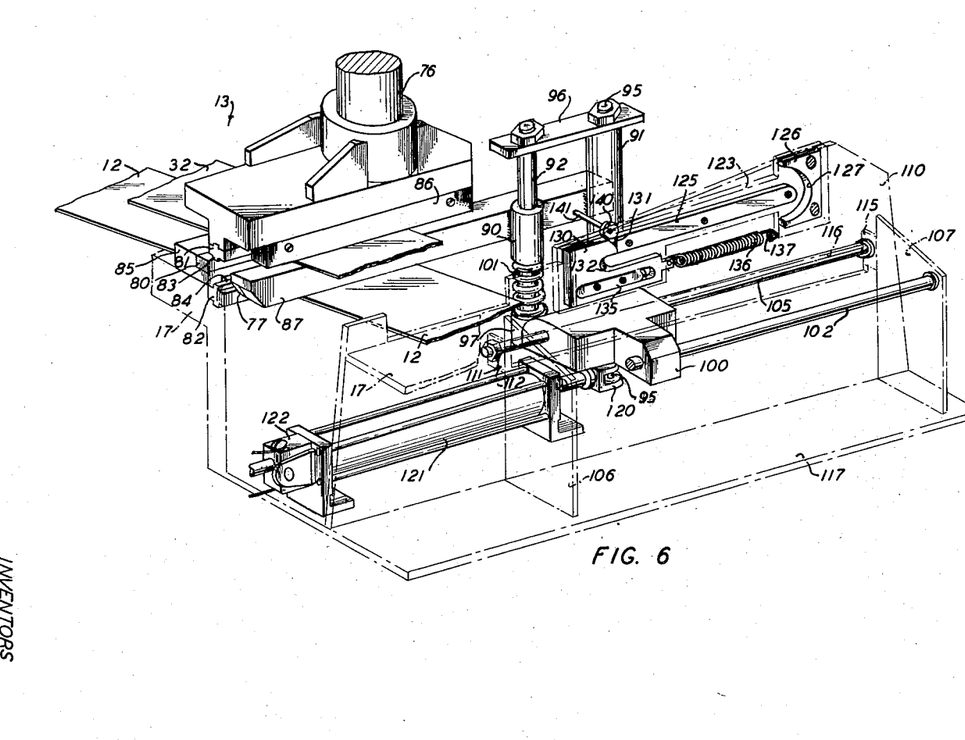
Fig. 6 is a perspective view of the cutting and joining apparatus illustrated in Figs. 3 and 4, looking in a direction wherein the left-hand portions of Fig. 3 and the right-hand portions of Fig. 4 are closest to the observer, having portions broken away for clarity and with the supporting structure shown in phantom lines.

Figs. 3, 4 and 6 show the structure for cutting and cold welding the tapes 12 and 32 together. As is best shown in Fig. 4, the lower tape 12 is advancing generally leftwardly as viewed in that figure across the supporting plate 17. The upper tape 32 is secured fixedly above the lower tape 12 by means of the pinch rolls 56 and 57 which hold the tape 32 in a position extending through the head 13. The trailing end of the tape 12 is severed by a cutting blade 77 cooperating with the edge of a lower, stationary, cold welding die 82. The leading end (or leftward end as viewed in Fig. 4) of the upper tape 32 is severed by a stationary cutting blade 80 cooperating with the edge of an upper, vertically movable, cold welding die 81. It can be seen from Figs. 4 and 6 that when the tapes 12 and 32 are severed by the blades 77 and 80, respectively, portions of these tapes overlap. The overlapping portions are joined by pressing them between the upper, vertically movable, cold welding die 81 and the lower, cold welding die 82 which is secured fixedly within the supporting plate 17. The dies 81 and 82 have serrated portions 83 and 84, respectively, along their cooperating faces to effect a cold welded splice between the tapes 12 and 32.

The upper blade 80 is secured to a blade holder 85 mounted fixedly upon the supporting plate 17. The blade holder 85 has sufficient clearance below it and along its length to permit the tape 12 to pass between it and the plate 17. The upper cold welding die 81 is secured to the lower end of the ram 76 and moves therewith. A pressure bar 86 is likewise secured to the lower end of the ram 76. The lower cutting blade 77 is secured to a blade holder 87 which is mounted for vertical movement.

Referring again to Figs. 4 and 6, when the ram 76 is moved downwardly, the left edge of the cold welding die 81 cooperates with the upper blade 80 to sever the leading end of the tape 32. The pressure bar 86 forces the lower blade holder 87 downwardly when the ram 76 moves downwardly. Therefore, the lower cutting blade 77 cooperates with the right edge of the lower, fixed cold welding die 82 to sever the trailing end of the lower tape 12. During such movement, the pressure bar 86 and the lower, movable blade holder 87 grip the upper tape 32 therebetween to assure vertically-downward movement of the upper tape 32 until the tapes 12 and 32 contact each other and are joined by pressure exerted thereon by the cold welding dies 81 and 82. As the ram 76 reaches its lowermost position, the ram 76 closes a switch 88, forming part of the circuit shown in Fig. 5, which in a manner hereinafter described energizes the solenoid valves 46, 50, 55 and the solenoid valves 69—69 associated with the cylinder 70 oppositely with respect to their energization described hereinabove. Such energization places the rest 42 and the clamps 47 and 52 back to their positions shown in Figs. 1 and 2 and causes the ram 76 to move upwardly.

Referring again to Figs. 4 and 6, after the cold welding of the tapes 12 and 32 and immediately before the ram 76 moves upwardly, the upper movable die 81 is adjacent to and alongside of the upper, fixed blade holder 85, and the lower, movable blade holder 87 is adjacent to and alongside of the lower die 82. Also, immediately above the lower die 82 is the integral tape comprising the joined tapes 12 and 32. At this time, the upper die 81 and the pressure bar 86 may ascend vertically with the ram 76 without interfering with the joined tapes 12 and 32. The lower blade holder 87, however, is in a position beneath the joined tapes 12 and 32 and cannot be raised vertically to its original position without forcing the joined tapes upwardly.

The apparatus best depicted in Figs. 3 and 6 is intended to overcome this problem by horizontally moving the lower blade holder 87 from under the joined tapes, moving it upwardly and replacing it horizontally to its original position (as depicted in Figs. 3, 4 and 6) over the moving tape. The lower, movable blade holder 87 is secured, by welding for example, to a pair of bearings 90 and 91, which are slidable vertically on guide rods 92 and 95, respectively. The upper ends of the rods 92 and 95 are secured by a horizontal bar 96, and the lower ends of the rods are mounted fixedly within a pair of bushings 97 and 99 which are secured by suitable means, such as welding to a T-shaped carriage 100. A spring 101 envelopes the guide rod 92 between the bearing 90 and the bushing 97.

The carriage 100 is slidable horizontally along guide rails 102 and 105. The guide rail 102 is secured between a pair of vertical standards 106 and 107, which are welded to a vertically-mounted plate 110. The guide rail 105 is secured by set screws 111—111 to lugs 112 and 115 that project from and are integral with the standards 106 and 107, respectively. The carriage 100 extends through an aperture 116 in the plate 110, and is slidable on the guide rails 102 and 105 between the vertical standards 106 and 107.

The vertical plate 110 is secured to the supporting plate 17 and a horizontal plate 117. The guide rod 95 extends below the carriage 100 and is coupled to a piston rod 120, which is associated with a cylinder 121 mounted fixedly on the horizontal plate 117. A solenoid valve 122 is associated with the cylinder 121 for actuating the piston rod 120. A mounting plate 123 is secured fixedly to the vertical plate 110 and a guide bar 125 is mounted fixedly on the plate 123. A block 126 having a semicircular cut out 127 formed therein is likewise mounted on the plate 123. A latch member 130 having a camming surface 131 and a detent 132 formed thereon is mounted for limited horizontal movement on the plate 123. The latch member 130 is retained slidably on the plate 123 by a latch retainer 135 secured fixedly to the plate 123. A spring 136 is hooked to the latch member 130 at one end and the other end thereof is secured to the vertical plate 110 by a pin 137. The spring 136 exerts a rightward force, as viewed in Fig. 3, upon the latch member 130.

A roller-type cam follower 140 is mounted rotatably on a shaft 141 secured by suitable means such as welding to the lower blade holder 87. When, as above-described, fluid is applied to the cylinder 70 to force the ram 76 downwardly, the pressure bar 86 moves the lower blade holder 87 downwardly and the cam follower 140, which is secured to the lower blade holder 87, also moves therewith. The blade holder 87 and associated bearings 90 and 91 move downwardly on the guide rods 92 and 95 causing compression of the helical spring 101. When the cam follower 140 moves downwardly, it contacts the camming surface 131 on the latching member 130 forcing leftwardly the latching member 130 which is mounted for limited horizontal, slidable movement on the latch retainer 135 against the urging of the spring 136.

When the ram 76 has completed its downward movement and the tapes 12 and 32 have been first severed and then joined as above-described, the cam follower 140 is at the same level as the detent 132 in the latching member 130. At this time, the spring 136 returns the latching member 130 to the right, as viewed in Figs. 3 and 6, thereby locking the lower blade holder 87 in a position below the joined tapes 12 and 32 where the lower blade holder 87 will not interfere with the passage thereover of the tapes. The uppermost point on the circumference of the cam follower 140 is positioned at the same level as the lower side of the guide bar 125 at this time and both are in the same plane. When the lower blade holder 87 is in this lower position, the spring 101, which is compressed between the bearing 90 and the bushing 97, forces the cam follower 140 against the latching member 130.

When the ram 76 has reached its uppermost position after the cutting and the joining of the tapes 12 and 32, a switch 142 forming part of the circuit shown in Fig. 5 is closed to energize a timer including a relay 145, shown in Fig. 5, and actuate the solenoid valve 122 associated with the cylinder 121 such that the piston rod 120 is advanced to the right as viewed in Figs. 3 and 6. Movement of the piston rod 120 to the right causes the carriage 100 and all of the structure associated therewith, guide rods 92 and 95, bearings 90 and 91, etc., and including the lower blade holder 87, also to move to the right. It should be noted, however, that the latch member 130, guide bar 125 and block 126, being secured to the stationary vertical plate 110 and not to the carriage 100, do not move. Since the cam follower 140 is secured within the detent 132 of the latching member 130, the lower blade holder 87 is retained at its lower level and will move to the right from its position beneath the joined tapes 12 and 32 to a position to the right of the joined tapes, but still at its lower level. During such movement the cam follower 140 rides along the lower side of the guide bar 125 and is urged thereagainst by the compressed spring 101.

When the piston rod 120 nears its extreme position to the right, as viewed in Figs. 3 and 6, the cam follower 140 enters the semicircular cut out 127 within the block 126. The spring 101 urges the cam follower 140 upwardly and around the cut out 127 until the lower blade holder 87 is at its original level and to the right of its original position. This upper level is determined by the bearing 91 abutting the horizontal bar 96. After a predetermined length of time, determined by the timer 144, the solenoid valve 122 is energized to retract the piston rod 120, that is, to move it to the left as viewed in Figs. 3 and 6. When the piston rod 120 has reached its extreme leftward position, the lower blade holder 87 will be in its original position above the lower tape 12 and will be prepared to perform a subsequent cutting operation.

A control circuit that may be used for operating the apparatus for cutting and joining the tapes 12 and 32 is shown in Fig. 5. As discussed hereinabove, when the tape 12 becomes nearly exhausted, the arm 61 contacts and closes the switch 62. Referring to Fig. 5, when the switch 62 is closed, the solenoid valve 63 is placed across supply lines 150—150 through normally-closed contacts 151—151 associated with a relay coil 152. Energization of the solenoid valve 63 allows the roller 67 associated with the accumulator 20 to descend and accumulate the tape 12 therein.

When the roller 67 reaches the bottom of its descent, the switch 68 is moved by the roller 67 supporting structure into contact with a terminal 155, placing the retracting coil of the solenoid valve 46 across the supply lines 150—150. Such energization of the solenoid valve 46 causes the rest 42 to be retracted within the cylinder 45. As the rest 42 withdraws into the cylinder 45, the detent 43 formed in the rest 42 trips and closes the switch 48. The closing of the switch 48 places a relay coil 156 across the supply lines 150—150 through a pair of normally-closed contacts 157—157 associated with a relay coil 160. The energizing of the relay coil 156 closes a plurality of contacts 161—161 to 164—164, inclusive, associated therewith.

The contacts 161—161 are holding contacts for the relay coil 156, and their closing short circuits the switch 48 to maintain the energization of the relay coil 156 when the switch 48 is opened. The closing of the contacts 164—164 energizes the solenoid valves 50 and 55 by placing the advancing coils associated therewith across the supply lines 150—150. Therefore, the clamps 47 and 52, controlled by the valves 50 and 55, respectively, move downwardly and secure the tapes 12 and 32 to the supporting plate 17. The closing of the contacts 163—163 energizes the solenoid valves 69—69, which apply fluid to the cylinder 70 to force the ram 76 downwardly. As described hereinabove, such downward movement of the ram 76 causes the cutting and cold weld splicing of the tapes 12 and 32. Finally, the closing of the contacts 162—162 by the relay coil 156 energizes the relay coil 152 which is placed across the supply lines 150—150 through the closed switch 62 and the closed contacts 162—162.

When the relay coil 152 is energized, contacts 166—166 and 167—167, associated therewith are closed and the normally-closed contacts 151—151 are opened. The closing of the contacts 166—166 bypasses the contacts 162—162 associated when the relay coil 156 to maintain the energization of the relay coil 152 when the relay coil 156 is de-energized. The opening of the contacts 151—151 de-energizes the solenoid valves 63 to cause the roller 67 in the accumulator 20 to ascend and pay out the tape 12. As described hereinabove, the paying out of the tape 12 is necessary at this time since the tapes 12 and 32 are clamped securely to the supporting plate 17 by the clamps 47 and 52. As the roller 67 reaches the top of its ascent, as shown in phantom lines in Fig. 1, the switch 68 is forced from contact with the terminal 155 and into contact with a terminal 170.

As the ram 76 lowers to affect the cutting and cold welding of the tapes 12 and 32, the switch 88 is closed thereby, as described hereinabove. Since the contacts 167—167 associated with the relay coil 152 are closed at this time, the relay coil 160 is placed across the supply lines 150—150 through the switch 88, the contacts 167—167 and a conductor 171. The energization of the relay coil 160 closes contacts 175—175 and 176—176 and opens the normally-closed contacts 157—157. The contacts 175—175 are holding contacts for the relay coil 160, and the closing thereof bypasses the switch 88 to maintain the relay coil 160 across the supply lines 150—150 when the switch 88 is opened. The closing of the contacts 176—176 places the advancing coil associated with the solenoid valve 46 across the supply lines 150—150 since the switch 68 is contacting the terminal 170 at this time.

When the advancing coil of the solenoid valve 46 is energized, the tape rest 42 is advanced to the position shown in Fig. 2. This movement of the rest 42 opens the switch 48 and de-energizes the relay coil 156. The de-energization of the relay coil 156 opens the contacts 164—164 to de-energize the advancing coils associated with the solenoid valves 50 and 55. This action is performed simultaneously with the closing of the contacts 176—176 so that retracting coils associated with the solenoid valves 50 and 55 are energized to release the clamps 47 and 52 from the tapes 12 and 32 and place them in the positions shown in Fig. 1. Also, the opening of the contacts 163—163 opens the circuit by which power was applied to the solenoid valves 69—69, associated with the ram 76.

The ram 76, therefore, moves upwardly, which movement opens the switch 88. As the ram 76 reaches its upper position shown in Fig. 1, the switch 142 is closed as described hereinabove. The timer 144 including the relay 145 is thereby placed across the supply lines 150—150 through the switch 142 and the contacts 167—167 and 175—175, which are closed at this time. Contacts 180—180 to 182—182, inclusive, are associated with the timer 144, with the contacts 180—180 being associated directly with the relay coil 145. When the timer 144 is energized initially, only the contacts 180—180 are closed instantly. Since the contacts 181—181 are closed at this time, the advancing coil associated with the solenoid valve 122 is placed across the supply lines 150—150. Therefore, the piston 120 urges the movable blade 77 and its associated structure to the right as viewed in Figs. 3 and 6.

As described hereinabove, after the roller 140 enters the cut out 127 and moves upwardly therein, the timer 144 operates to move the blade 77 to the left. This is accomplished by simultaneously opening the contacts 181—181 and closing the contacts 182—182 after a predetermined period of time determined by a timing mechanism (not shown) within the timer 144. It can be seen in Fig. 5 that the opening of the contacts 181—181 deenergizes the advancing coil associated with the solenoid valve 122 and closing of the contacts 182—182 energizes the retracting coil associated therewith. The movable blade 77 is therefore moved to the left, as viewed in Figs. 3 and 6, and placed in its original position above the lower integral tape 12 and 32 now being drawn through the apparatus in preparation for a subsequent cutting and cold welding operation.

As the new supply pad 33 of tape is moved to the advanced position adjacent to the machine 15, as shown in Fig. 1, the operator lifts the arm 61 and thereby opens the switch 62. The opening of the switch 62 de-energizes the relay coil 152. Such de-energization of the solenoid coil 152 opens the contacts 167—167 associated therewith to de-energize the timer 144 and the relay coil 145 therein. De-energization of the timer 144 opens the contacts 182—182 associated therewith to de-energize the retracting coil associated with the solenoid valve 122. Also, opening of the contacts 167—167 opens the circuit to the relay coil 160 which is de-energized thereby. After a new pad of tape has been placed between the rods 41—41 and the leading end of the new pad has been threaded through the machine into the original position of the tape 32, the apparatus is prepared to perform a subsequent cutting and cold welding operation on the tapes 12 and 32.

It is to be understood that the above-described embodiment of the invention is merely illustrative of the principles of the invention and that numerous other modifications and embodiments of the invention may be devised within the spirit and scope thereof.

What is claimed is:

1. Apparatus for cutting the trailing end of a first tape and the leading end of a second tape and joining the two ends together, which comprises a pair of cutting knives for cutting the ends of the tapes and so positioned that the ends of the tapes overlap after having been cut, one of the knives being mounted for vertical movement, means adjacent to the cutting knives for joining the overlapping ends of the tapes, means mounted for vertical reciprocable movement for moving a part of the tape-joining means downwardly and pressing the overlapped ends of the tapes together after severance to join them, the reciprocably-mounted means moving the movable knife downwardly until the knife is in a position below the tapes after the ends of the tapes have been cut and joined, latching means for retaining the movable knife in its position below the joined tapes after the reciprocably-mounted means has moved upwardly, means operably connected to the movable knife for moving the movable knife transversely of the joined tapes from its position below the tapes, around the sides thereof and to its original position above its corresponding tape in preparation for a subsequent cutting operation.

2. In combination with apparatus for cutting and joining tapes wherein the trailing end of a first tape and the leading end of a second tape are severed by cutters and the severed ends are pressed together, with one of the cutters being movable, positioned above a corresponding tape to be severed prior to the severing thereof and positioned below the joined tapes after such severance, apparatus for returning the movable cutter to its original position in preparation for a subsequent severing operation, which comprises a fixed frame, a latching member mounted on the frame, the latching member being designed for engaging and retaining the movable cutter in its position below the joined tapes, a fluid-actuated cylinder mounted on the frame and having a reciprocable piston therein and a piston rod which is connected to the movable cutter, means for applying fluid to one side of the piston to move the cutter transversely of the tapes and from its position below the joined tapes, means for forcing the movable cutter from its lower level to the level prior to the severing of the tapes, and means for applying fluid to the opposite side of the piston to return the movable cutter to its original position above its corresponding tape.

3. In combination with apparatus for cutting and joining tapes wherein the trailing end of a first pad of tape and the leading end of a second pad of tape are severed by cutters and the severed ends are overlapped and pressed together to join them securely, and wherein one of the cutters is mounted for vertical movement with respect to a corresponding one of the tapes to be severed, is positioned above such a tape prior to the severing thereof and is positioned below the joined tapes after such severance, apparatus for returning the movable cutter to its original position above its corresponding tape in preparation for a subsequent severing operation, which comprises a support, a latching member having a detent formed therein mounted slidably on the support, a cam follower secured fixedly to the movable cutter and designed to be received in the detent in the latching member and to be retained therein when the movable cutter is in its position below the joined tapes, a plurality of horizontal guideways secured to the support, one of which is mounted adjacent to the top of the cam follower when the movable cutter is in its position below the joined tapes, a carriage secured to the movable cutter and mounted on at least one of the other horizontal guideways for vertically-slidable movement thereon, a compression spring positioned between the movable cutter and the carriage such that it is placed in compression when the movable cutter is in its position below the joined tapes, a fluid-actuated cylinder secured to the support and having a reciprocable piston therein and a piston rod operably connected to the carriage, valve means for applying fluid to either side of the piston, means for actuating the valve means to apply fluid to one side of the piston so that the carriage and the cam follower are moved along their corresponding horizontal guideways with the movable cutter being moved from its position below the joined tapes and transversely thereof and with the cam follower keeping the movable cutter in its lower position and the spring under compression, a curved guideway for guiding the cam follower upwardly and allowing the compression spring to force the movable cutter from its position below the joined tapes to its upper level prior to the severing of the tapes, and means for actuating the valve means to apply fluid to the opposite side of the piston and return the movable cutter to its original position above its corresponding tape.

4. In apparatus for cutting the trailing end of a first tape and the leading end of a second tape and cold welding the two ends together wherein a pair of cutters sever the tape ends, the ends are overlapped and a pair of cold welding dies press the overlapped tape ends together and join them, the improvement which comprises a base, means for securing one of the cold welding dies and one of the cutters fixedly to the base, the second cutter being positioned over a corresponding one of the tapes to be cut, a ram for engaging and moving the second cold welding die and the second cutter with respect to the fixed die and the fixed cutter so that the fixed cutter cooperates with the movable die and the movable cutter cooperates with the fixed die to sever the ends of the tapes, the ram forcing the movable cutter vertically downward to a position below the level of the tapes after the cutting and joining thereof, a roller secured rotatably to the movable cutter, a latching member secured slidably to the base and having a detent formed therein, a first spring having one end secured to the base and its other end secured to the latching member, the roller moving the latching member against the urging of the first spring when the ram forces the movable cutter to its position below the tapes and the spring returning the latching member and placing the detent into contact with the roller when the movable cutter reaches the lower position to retain the movable cutter in such position, a pair of horizontal guideways one of which is adjacent to the roller when the movable cutter is in its position below the joined tapes, a carriage mounted slidably on the second horizontal guideway, a vertical guide rod secured to the carriage for horizontal movement therewith and for guiding the movable cutter in its vertical movement, a second spring positioned around the vertical guide rod and between the movable cutter and the carriage, the second spring being placed under compression when the movable cutter is forced to its lower position below the joined tapes, a fluid-operated cylinder having a reciprocable piston therein and a piston rod connected between the piston and the carriage, a solenoid valve for applying fluid to either side of the piston, means for energizing the valve to apply fluid to one side of the piston and to move the carriage along its corresponding horizontal guideway, the roller along its corresponding horizontal guideway and the movable cutter transversely of the joined tapes from its position below the tapes, a block having a curved guideway formed therein secured to the base for receiving the roller and allowing the second spring to force the movable cutter to its original level above its corresponding tape, and means for actuating the valve to apply fluid to the opposite side of the piston so that the cutter is placed in its original position above its corresponding tape and will be prepared for a subsequent cutting operation.

5. Apparatus for cutting and joining a pair of tapes positioned in overlapping, spaced relationship to each other, which comprises a movable cutter normally positioned in the space between the tapes, means for moving said movable cutter with respect to a first one of the tapes to sever that tape, said moving means being designed so that the severing motion continues until said movable cutter has been moved to a position entirely on the opposite side of the first tape from its normal position, means for moving the second tape toward the first tape so that an end portion of the second tape is placed in overlapping relationship with a severed, free end of the first tape, means for joining the overlapping ends of the two tapes to form an integral tape occupying substantially the position formerly occupied by the first tape, and means for moving said movable cutter from its opposite-side position, around a side edge of the integral tape, and back to its normal position in preparation for a subsequent cutting operation.

6. Apparatus for cutting and joining a pair of tapes positioned in overlapping, spaced relationship to each other, which comprises a movable cutter normally positioned in the space between the tapes, means for moving said movable cutter with respect to a first one of the tapes to sever that tape, said moving means being designed so that the severing motion continues until said movable cutter has been moved to a position entirely on the opposite side of the first tape from its normal position, means for moving the second tape into contact with the first tape, a second cutter designed, upon the movement of the second tape toward the first tape, for cutting the second tape so that a free end thereof is placed by the second-tape moving means into overlapping relationship with a severed, free end of the first tape, means for joining the overlapping ends of the two tapes to form an integral tape occupying substantially the position formerly occupied by the first tape, and means for moving said movable cutter from its opposite-side position, around a side edge of the integral tape, and back to its normal position in preparation for a subsequent cutting operation.

7. Apparatus for cutting and joining a pair of tapes positioned horizontally in overlapping, spaced relationship to each other, which comprises a movable cutter normally positioned in the space between the tapes, means for moving said movable cutter downward to sever the lower tape, said movable cutter and moving means being so constructed and arranged that the downward movement continues until said movable cutter has been moved to a position entirely beneath the lower tape and further so that one of the severed ends of the lower tape is retained in its original position, means for moving the upper tape downward into contact with the lower tape, a second cutter having its cutting edge mounted in spaced, parallel relationship to the cutting edge of the movable cutter and designed, upon the downward movement of the upper tape, to sever that tape so that a free end thereof is placed by the upper-tape moving means in overlapping relationship with the retained, severed end of the lower tape, means for joining the overlapping ends of the two tapes to form an integral tape occupying substantially the position formerly occupied by the lower tape, and means for moving said movable cutter from its lowered, after-cutting position beneath the integral tape, around a side edge thereof, and back to its normal position thereabove in preparation for a subsequent cutting operation.

8. Apparatus for cutting and joining a pair of tapes positioned horizontally in overlapping, spaced relationship to each other, which comprises a movable cutter normally positioned in the space between the tapes, means for moving said movable cutter downward to sever the lower tape, said movable cutter and moving means being so constructed and arranged that the downward movement continues until said movable cutter has been moved to a position entirely beneath the lower tape and further so that one of the severed ends of the lower tape is retained in its original position, means for moving the upper tape downward into contact with the lower tape, a second cutter having its cutting edge mounted in spaced, parallel relationship to the cutting edge of the movable cutter and designed, upon the downward movement of the upper tape, to sever that tape so that a free end thereof is placed by the upper-tape moving means in overlapping relationship with the retained, severed end of the lower tape, means for joining the overlapping ends of the two tapes to form an integral tape occupying substantially the position formerly occupied by the lower tape, means for engaging and retaining the movable cutter in its lowered, after-cutting position below the integral tape, means for moving the lowered, movable cutter in a horizontal direction transverse to the line of the integral tape to a position whereat the movable cutter is retracted completely from beneath the integral tape, means for moving the retracted, movable cutter upward until it is above the level of the integral tape, and means for moving the elevated, movable cutter back to its normal position above the integral tape in preparation for a subsequent cutting operation.

References Cited in the file of this patent

UNITED STATES PATENTS

| 2,078,365 | Biggert et al. | Apr. 27, 1937 |
| 2,369,830 | Johnson et al. | Feb. 20, 1945 |
| 2,522,408 | Sowter | Sept. 12, 1950 |

FOREIGN PATENTS

| 471,049 | Great Britain | Aug. 23, 1937 |